United States Patent [19]
Magnani

[11] Patent Number: 5,458,177
[45] Date of Patent: Oct. 17, 1995

[54] MACHINE FOR MOUNTING TIRES ON WHEEL RIMS

[75] Inventor: Franco Magnani, Correggio, Italy

[73] Assignee: MACIS S.r.l., Correggio, Italy

[21] Appl. No.: 241,526

[22] Filed: May 12, 1994

[30] Foreign Application Priority Data

May 14, 1993 [IT] Italy .............................. M093U0012 U

[51] Int. Cl.⁶ .................................................. B60C 25/132
[52] U.S. Cl. ......................................... 157/1.17; 157/1.24
[58] Field of Search ..................... 157/1.17, 1.2, 157/1.1, 1.21, 1.22, 1.24, 1.26, 1.28

[56] References Cited

U.S. PATENT DOCUMENTS 3,722,570  3/1973  McKenney ............................. 157/1.17

FOREIGN PATENT DOCUMENTS 0042363  12/1981  European Pat. Off. .
1585025   1/1970   France .
2128724   10/1972  France .
224467    7/1910   Germany .

*Primary Examiner*—Debra Meislin
*Attorney, Agent, or Firm*—Guido Modiano; Albert Josif

[57] ABSTRACT

The machine has a base, a fixed arm connected to the base and defining an inverted "U"-shaped configuration having a free end. A conventional bead extractor is connected to the free end of the fixed arm, which overlies a rotatable tire-supporting platform driven by a drive unit. The rotatable platform is mounted on a plate having opposite sides provided with bearings movably connected to a pair of parallel guide elements fixed to the sides of the base. A fine-adjustment mechanism is provided for positioning the plate and the rotatable platform with respect to the bead extractor and the fixed arm for accommodating a wide range of different sizes of wheels and tires.

6 Claims, 2 Drawing Sheets

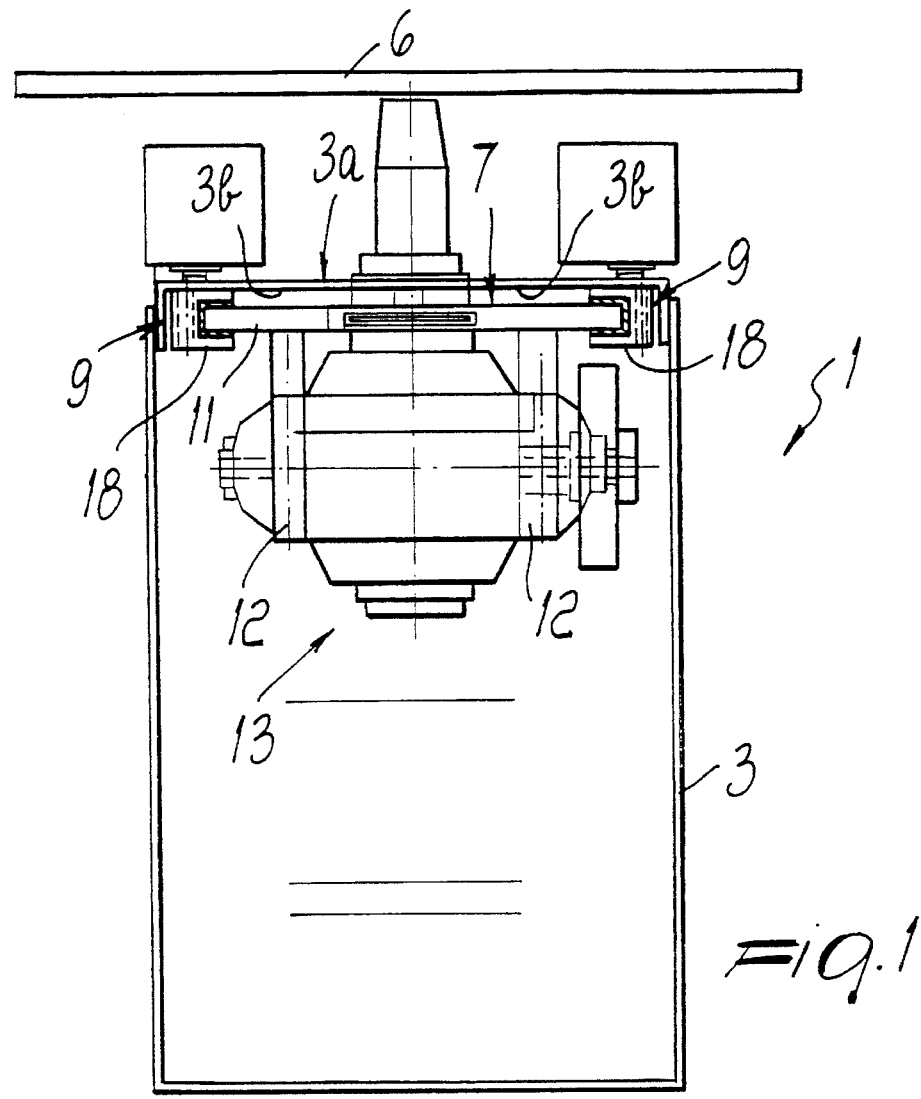
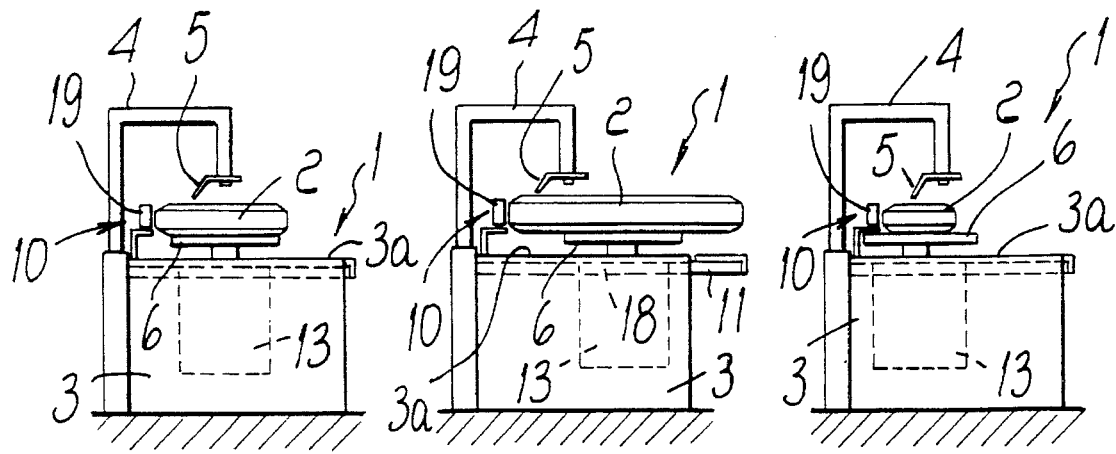

1

MACHINE FOR MOUNTING TIRES ON WHEEL RIMS

BACKGROUND OF THE INVENTION

The present invention relates to a machine for mounting tires on and removing tires from wheel rims of any diameter.

Machines for mounting and removing tires of vehicles from their respective wheel rims are known.

In practice, these machines consist of a base frame on which a horizontal rotating platform is provided; said platform has claws that clamp the wheel rim during the tire removal operation, which is performed in practice with the aid of a so-called bead extractor. The bead extractor has an arm that is shaped like an inverted U, and is mounted eccentrically on the frame of the machine. A specific fixture is supported on the arm in a cantilevered manner in the direction of the platform and is adapted to act between the sidewall of the tire and the wheel rim itself.

Since wheel rim diameters may vary both according to the type of the vehicles and according to their purpose, said arm is mounted so that it can move with respect to the center of the rotating platform in order to increase, if required, the useful space available for the horizontal support of the wheel between the upright which is fixed to the frame and the center of the platform.

This structural arrangement only partially solves the problem of multiple diameters. Movement of the arm is in fact limited in its extent both by the structure of the machine and by the space occupied during use, but most of all, when the arm is moved there is a considerable increase in the moment of flexure that discharges at the base where said arm is coupled to the frame of the machine.

SUMMARY OF THE INVENTION

This entails the need to size the cross-sections so as to withstand said moment of flexure without breaking, and oversizing is necessary to take into account the eccentricity that said working arm can assume.

Considerable cross-sections and thickness of material are thus required, increasing the manufacturing and sales costs.

Furthermore, as mentioned, the extent of the movements of the arm is limited, so that it is not possible to process wheel rims of many diameters with a single machine.

A final requirement is the capability of working on wheels that have small diameters, which are notoriously more rigid on their sides, with the smallest possible lever arm for the tool.

With this aim and these objects in view, the invention provides a machine for mounting tires on and removing tires from wheel rims of any diameter, comprising a box-like base from which a fixed arm rises eccentrically, said arm being shaped like an inverted U and supporting a bead extractor fixture at one free end directed towards the base, a rotating wheel supporting platform protruding from the opposite upper face of said base, said platform being provided with conventional means for securing the wheel rim, characterized in that said platform is mounted on means that can slide horizontally with respect to said base with a stroke that can be finely adjusted by virtue of appropriate elements, said stroke being orientated in a direction that converges/diverges with respect to said arm, said sliding means being supported by guiding devices which are rigidly coupled to the base, elements for seating the tire mounted on the wheel rim being furthermore provided.

BRIEF DESCRIPTION OF THE DRAWINGS

Further characteristics and advantages will become apparent from the description of a preferred embodiment of a machine for mounting and removing tires on wheel rims of any diameter, according to the invention, illustrated only by way of non-limitative example in the accompanying drawings, wherein:

FIG. 1 is a schematic vertical sectional view of the invention;

FIGS. 2, 3, and 4 are reduced-scale views of the invention during use respectively on wheels having medium, large and small diameters;

DESCRIPTION OF THE PREFERRED EMBODIMENTS

Figure 5:
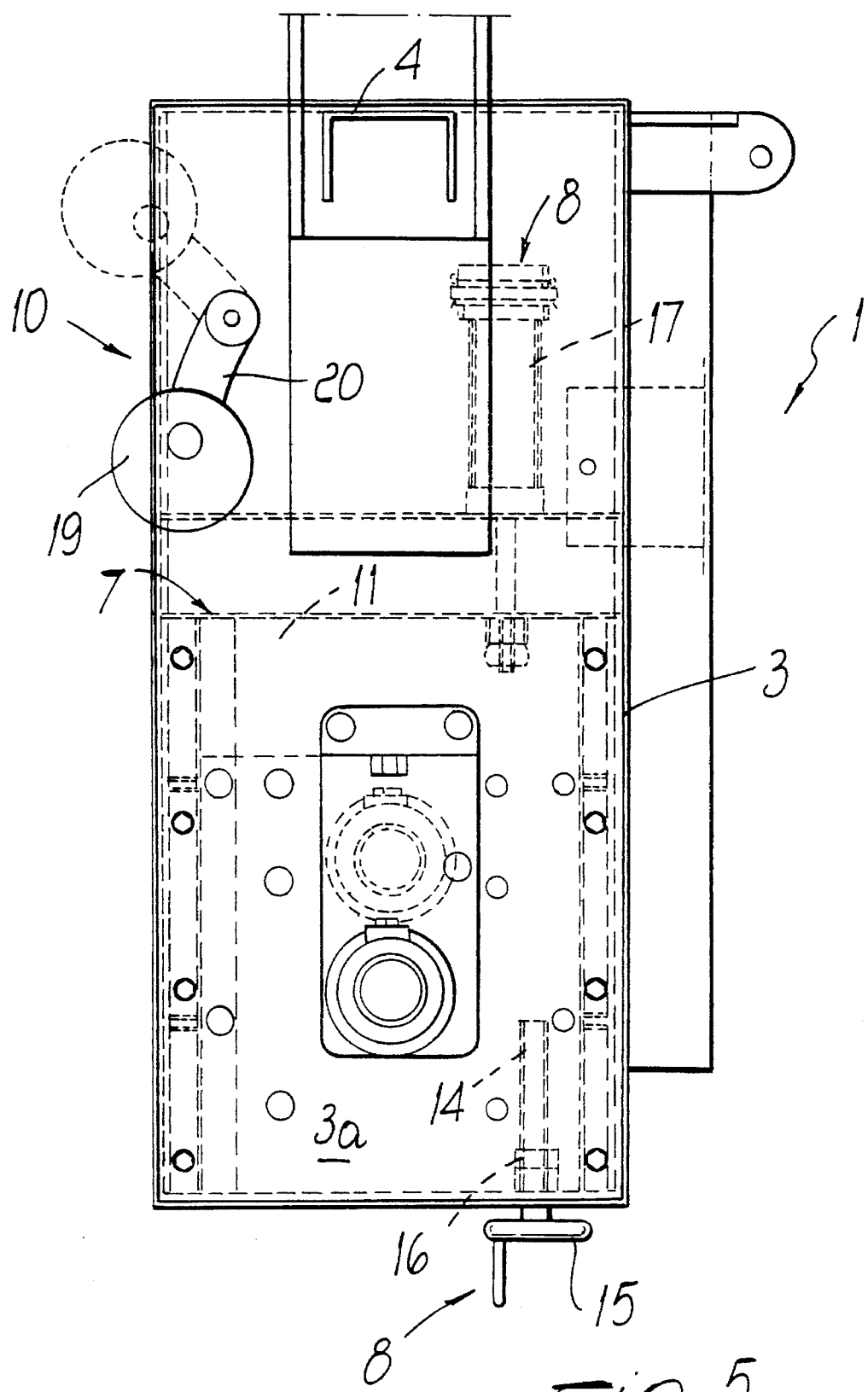
FIG. 5 is again a schematic and partially sectional plan view of the machine for mounting and removing tires of any diameter.

With particular reference to the above figures, the reference numeral 1 generally designates a machine for mounting tires on and removing tires 2 from wheel rims of any diameter, of the type constituted by a box-like base 3 from which a fixed arm 4, disposed at one end of the base 3, rises vertically from said base, said arm is shaped like an inverted U and supports a bead extractor fixture 5 at one free end which is directed toward the base 3.

A rotating platform 6 protrudes from the oppositely arranged upper face 3a of the base 3, and any wheel can be rested thereon irrespective of its diameter; said platform 6 is provided with conventional wheel rim securing means, which are in any case of a known type and are accordingly not illustrated in detail.

Said rotating platform 6 is mounted on means 7 that can slide horizontally with respect to said base 3; the stroke of said means can be adjusted finely by virtue of associated elements 8: said stroke is directed so as to converge or diverge with respect to said fixed arm 4, and said sliding means 7 are in turn supported by appropriate guiding devices 9 which are rigidly coupled to the base 3; finally, there are elements 10 for seating the tire 2 when it is mounted on its wheel rim.

Said horizontally sliding means 7 are composed of a quadrangular plate 11, two opposite sides of which are provided with conventional bearings antifriction devices; a drive unit 13 for rotating said platform 6 and the wheel rim securing means are supported below said plate by means of brackets 12.

The elements 8 for the fine adjustment of the stroke of the plate 11 are constituted, in a first possible embodiment, by a worm screw 14 that can be rotated to the left and to the right from outside by means of a handwheel 15; said worm screw 14 is supported by the box-like base 3 and engages a corresponding sleeve 16 which is coaxial thereto and protrudes from the plate 11.

Advantageously, an additional possible embodiment of said elements 8 entails the use of a double-action pneumatically- or hydraulically-operated actuator 17 which is interposed between said plate 11 and the box-like base 3 in order to move the plate with respect to the base.

The guiding means 9 are in turn constituted by at least one pair of open profiled elements 18 which have C-shaped transverse cross-sections and are mounted, so that their openings face each other and so that they are horizontally mutually parallel, on the corresponding sides of the box-like base 3, proximate to the top 3b of said base; said sides of the plate 11 that are provided with the antifriction devices engage in said profiled elements 18.

Optionally, on the upper face 3a of the base 3 it is possible to apply a roller 19 that has a vertical rotation axis and forms said elements 10 for seating the tire 2 once it has been mounted on its wheel rim; said roller 19 is articulated eccentrically to a horizontal supporting arm 20 which is in turn rotatably articulated to said upper face 3a of the base 3.

The operation of the invention is evident from the above description: a tire 2 and its wheel rim are placed in a known manner on the rotating platform 6, which is positioned, either manually or by means of the actuator 17, at a greater or smaller distance from the bead extractor fixture 5, i.e. so as to vary the distance of the center of rotation of said platform from said fixture; the lever arm of said fixture thus remains substantially unchanged regardless of the large or small diameter of the tire.

This is highly advantageous in case of interventions on small-diameter tires that have the characteristic of having extremely rigid sidewalls: the availability, in this case, of a high active moment applicable to the arm 4 and by said arm to the bead extractor 5 is essential to work easily without having to provide a specifically designed or oversized machine.

It is furthermore possible to provide the machine 1 with a roller 19 which is rotatably mounted on one end of an associated secondary arm 20 and can, by rotating said secondary arm, be placed in contact with the tread of the freshly mounted tire 2, inflated at medium pressure, pressing on it and forcing its sidewalls to correctly fit on the keying edges of the wheel rim prior to final inflation at the correct working and balancing pressure.

In the practical embodiment of the invention, the materials, the shape and the dimensions may be any according to the requirements without thereby abandoning the protective scope of the following claims.

What is claimed is:

1. Machine for mounting tires on and removing tires from wheel rims of any diameter, comprising a box-like base, a fixed arm disposed at one end of the base 3 and rising from said base (3), said arm being shaped like an inverted U and supporting a bead extractor fixture at one end directed towards the base, a rotating wheel supporting platform, said platform protruding from the upper face of said base, said platform being provided with conventional means for securing the wheel rim, wherein said platform is mounted on sliding means that can slide horizontally with respect to said base, said sliding being finely adjusted by virtue of fine adjustment elements, said sliding being orientated in a direction that converges/diverges with respect to said arm, said sliding means being supported by guiding devices which are rigidly associated to said base, and said upper face of said base supporting elements for seating the tire mounted on the wheel rim.

2. Machine according to claim 1, wherein said sliding means comprise a quadrangular plate, two opposite sides of which have conventional antifriction devices, a drive unit being supported, by means of associated brackets, below said plate, said drive unit rotating the platform and the wheel securing means.

3. Machine according to claim 2, wherein said fine adjustment elements are constituted by a worm screw which is actuated from outside by means of a handwheel and is supported by the base, said worm screw engaging a corresponding coaxial sleeve that protrudes from said quadrangular plate.

4. Machine according to claim 2, wherein said fine adjustment elements comprise a double-action pneumatically- or hydraulically-operated actuator interposed between said plate and the box-like base.

5. Machine according to claim 2, wherein said guiding devices comprise two profiled elements that have a C-shaped cross-section which are arranged mutually opposite and horizontally parallel and are rigidly coupled to the corresponding sides of the box-like base proximate to the top of said base, the corresponding sides of the plate provided with antifriction devices engaging in said profiled elements.

6. Machine according to claim 1, wherein said elements for seating the tire mounted on the wheel rim comprise at least one roller which has a vertical rotation axis and is rotatably mounted on one end of an associated horizontal secondary arm which is articulated to said upper face of the box-like base, and is proximate to the fixed arm, said roller being moved, through the rotation of said secondary arm, from an active position in which it is in forced contact with the tread of the mounted tire to an inactive position which is directed away from said tire.

* * * * *